US011014397B2

(12) United States Patent
Vukaj (10) Patent No.: US 11,014,397 B2
(45) Date of Patent: May 25, 2021

(54) ADJUSTABLE ANGLE MEASUREMENT TOOL

(71) Applicant: David Vukaj, Queens, NY (US)

(72) Inventor: David Vukaj, Queens, NY (US)

( * ) Notice: Subject to any disclaimer, the term of this patent is extended or adjusted under 35 U.S.C. 154(b) by 238 days.

(21) Appl. No.: 16/362,402

(22) Filed: Mar. 22, 2019

(65) Prior Publication Data

US 2020/0298612 A1   Sep. 24, 2020

(51) Int. Cl.
*B43L 7/12* (2006.01)
*G01B 3/56* (2006.01)

(52) U.S. Cl.
CPC .............. *B43L 7/12* (2013.01); *G01B 3/566* (2013.01)

(58) Field of Classification Search
CPC .. B43L 7/12; B43L 7/027; B43L 7/033; B43L 7/10
USPC ......... 33/471, 452, 453, 456, 458, 459, 465, 33/474, 478, 482
See application file for complete search history.

(56) References Cited

U.S. PATENT DOCUMENTS

| | | | | |
|---|---|---|---|---|
| 368,434 A * | 8/1887 | Tiller | ..................... | G01C 15/10 33/392 |
| 537,473 A * | 4/1895 | Morton | ..................... | B43L 7/12 33/473 |
| 593,608 A * | 11/1897 | Rosenkranz | ............. | G01C 9/26 33/332 |
| 765,300 A * | 7/1904 | Williams | .................. | B43L 9/04 33/27.03 |
| 1,134,845 A * | 4/1915 | Haga | ....................... | G01B 3/56 33/473 |
| 1,158,775 A * | 11/1915 | Benjamin | .............. | G01B 3/566 403/93 |
| 1,226,173 A * | 5/1917 | Benjamin | ................ | G01B 3/06 403/97 |
| 1,907,459 A * | 5/1933 | Stowell | ..................... | G01B 3/06 403/101 |
| 3,490,148 A * | 1/1970 | Mathes | ..................... | G01B 3/06 33/458 |
| 4,446,627 A | 5/1984 | Persson | | |
| 4,454,657 A | 6/1984 | Yasumi | | |
| 4,525,933 A * | 7/1985 | Patterson | .................. | B43L 7/12 33/470 |
| 4,920,658 A * | 5/1990 | Hile | .......................... | B43L 7/12 33/465 |
| 5,509,213 A * | 4/1996 | Kelly | ...................... | A47G 1/205 33/451 |

(Continued)

FOREIGN PATENT DOCUMENTS

CN        105091685 A        11/2015

OTHER PUBLICATIONS

International Search Report dated Apr. 27, 2020 in corresponding International Application No. PCT/US2020/016114.

*Primary Examiner* — Christopher W Fulton
(74) *Attorney, Agent, or Firm* — Abelamn, Frayne & Schwab; Stefan Knirr (57) ABSTRACT

An angle measurement tool includes first and second elongate members, one of the first and second longitudinal members having an aperture defined by an inner circumference shaped as an outer circumference of an eight-pointed star polygon, the other one to the first and second elongate members having a fixing means adapted for engagement in the aperture of the first elongate member so as to fix the first and second elongate members at a predetermined angle relative to each other.

8 Claims, 12 Drawing Sheets

(56) References Cited

U.S. PATENT DOCUMENTS

| | | | |
|---|---|---|---|
| 6,237,238 | B1 | 5/2001 | Shapiro |
| 7,047,655 | B2 | 5/2006 | Larsson |
| 7,278,221 | B1 * | 10/2007 | Shapiro .................... B25H 7/00 33/471 |
| 7,752,765 | B2 | 6/2010 | Shapiro |
| 7,908,755 | B2 | 5/2011 | Rushing |
| 8,782,914 | B1 | 7/2014 | Deluca |
| 2007/0240321 | A1 | 10/2007 | Shapiro |

* cited by examiner

FIG. 12D

ADJUSTABLE ANGLE MEASUREMENT TOOL

FIELD OF THE INVENTION

The present invention relates to angle measurement tools. More particularly, the present invention relates to an adjustable angle measurement tools that can be adjusted to a plurality of preset angles.

BACKGROUND OF THE INVENTION

The following discussion of related art is provided to assist the reader in understanding the advantages of the invention, and is not to be construed as an admission that this related art is prior art to this invention.

Angle measurement tools with adjustable angles are used in the construction profession including finish carpentry, piping layouts, floor and ceiling installations and cabinetry. Known angle measurement tools with adjustable angles include those disclosed in U.S. Pat. Nos. 7,047,655 and 4,446,627. These angle measurement tools require a relatively large number of individual parts and their manufacture is thus associated with corresponding costs.

It would therefore be desirable and advantageous to provide an improved angle measurement tool that is simple to manufacture and easy to use.

SUMMARY OF THE INVENTION

According to one aspect of the present invention, an angle measurement tool includes first and second elongate members, one of the first and second elongate members having an aperture defined by an inner circumference shaped as an outer circumference of an eight-pointed star polygon, the other one to the first and second elongate members having fixing means adapted for engagement in the aperture of the first elongate member so as to fix the first and second elongate members at a predetermined angle relative to each other.

According to another advantageous feature of the invention, the second member includes spaced apart first and second sidewalls, with the first elongate member received between the first and second sidewalls.

According to another advantageous feature of the invention one of the first and second sidewalls has an opening through which at least a portion of the aperture of the first elongate member is visible.

According to another advantageous feature of the invention, the fixing means is supported on the second elongate member for movement between an engaged position in which the fixing means engages in the aperture and a disengaged position in which the fixing means is disengaged form the aperture.

According to yet another advantageous feature of the invention, the angle measurement tool further includes a spring biasing the fixing means toward the engaged position.

The fixing means can be any structure that is capable of engaging the aperture of the first elongate member to thereby fix the first elongate member relative to the second elongate member.

According to another advantageous feature of the invention, the angle measurement tool can further include a bearing, which couples the first and second elongate members for rotation relative to each other about a rotation axis defined by a geographical center of the aperture.

According to another aspect of the invention, an angle measurement tool, includes a first elongate member and a second elongate member, each of said first and second elongate members provided with a respective aperture defined by an inner circumference shaped as an outer circumference of an eight-pointed star polygon; and fixing means adapted for engagement in the aperture of the first and second elongate member so as to fix the first and second elongate members at a predetermined angle relative to each other.

According to another aspect of the invention, an angle measurement tool includes first, second and third elongate members detachably attachable to each other so as to form a triangle in which the first, second and third elongate members are fixed at a predetermined angle relative to each other via engagement of fixing means in apertures provided in at least two of the first, second and third elongate members, the apertures being defined by an inner circumference shaped as an outer circumference of an eight-pointed star polygon.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

As used herein, the term regular eight-pointed star polygon includes regular star polygons defined by the so-called Schlafli symbols {8/2} and {8/3}. The regular star polygon with Schlafli symbol {8/2} is formed by connecting with straight lines every point out of eight regularly spaced points lying on a circular circumference to a respective second next point on the circumference, whereas the regular star polygon {8/3} is formed by connecting with straight lines every third point out of eight regularly spaced points lying on a circular circumference.

Figure 1:
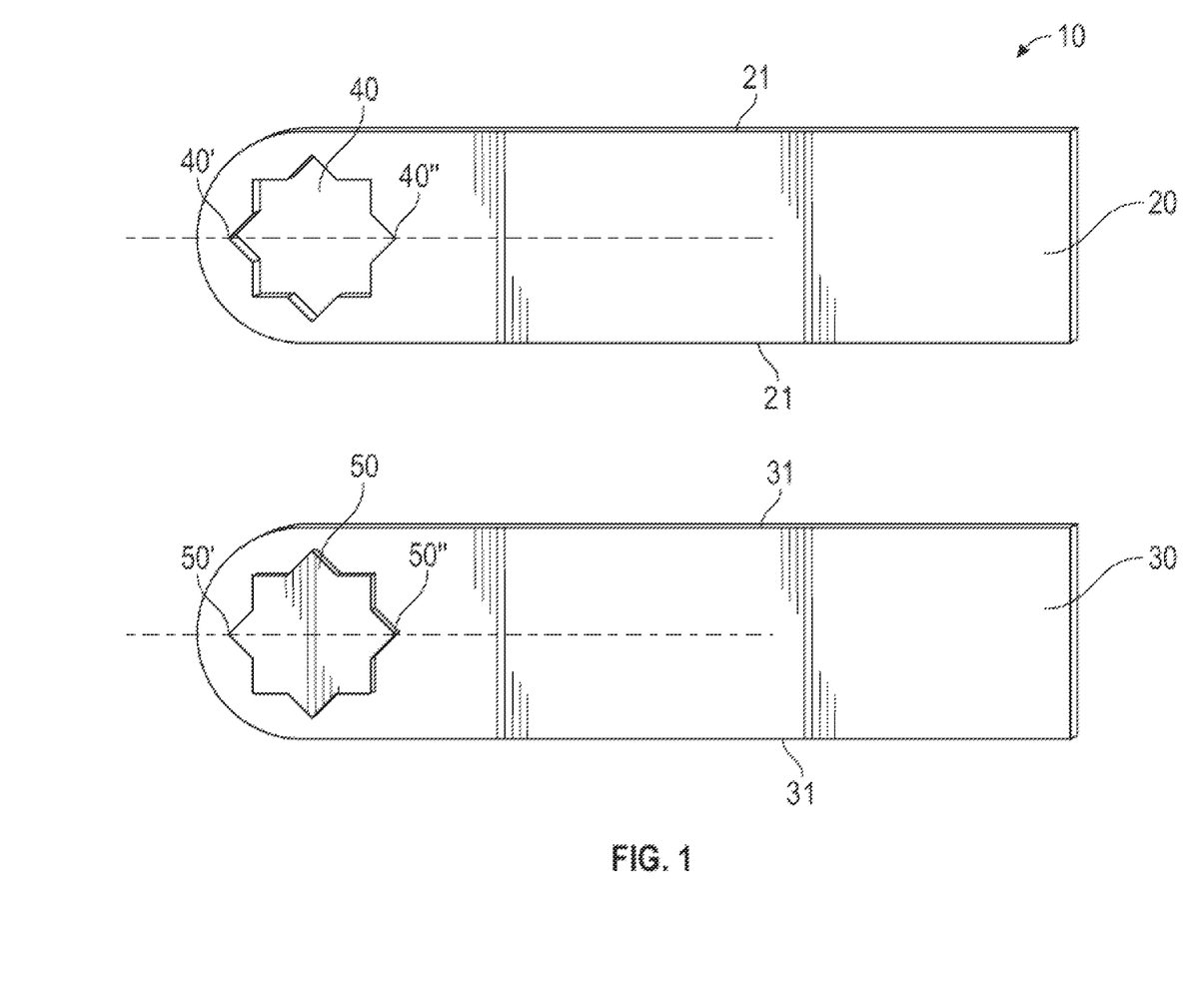
FIG. 1 shows a top perspective view of a first embodiment of the angle measurement tool according to the present invention with the elongate members detached.

FIG. 1 shows an embodiment of the angle measuring tool 10 according to the present invention including first and second plate shaped elongate members 20 and 30, both having parallel straight edges 21, 31. The first elongate member 1 has an aperture 40 defined by an inner circumference having a shape that corresponds to the shape of the outer circumference of a regular eight-pointed star polygon with Schlafli symbol {8/2}. A fixing member 50 is rigidly attached to the second elongate member 30. The fixing member 50 has an outer circumference that matches the inner circumference of the aperture 40. configured so that engagement of the fixing member 50 in the aperture 40 fixes the first and second members 20, 30 relative to each other at a predetermined angle. In the embodiment shown in FIG. 1 the outer circumference of the fixing member 50 matches the inner circumference of the aperture 40. Upon engagement of the fixing member 50 in the aperture, the outer circumference of the fixing member 50 engages with the inner circumference of the aperture 40 and restricts rotation of the first and second members 20, 30 relative to each other.

Figure 2A:
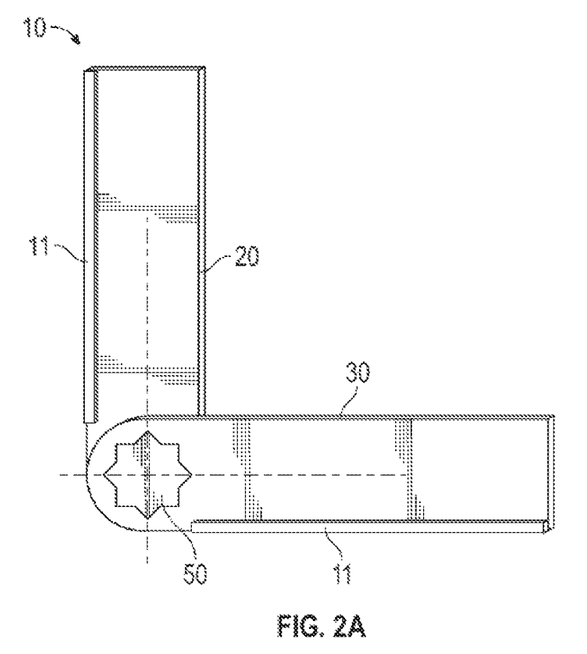
FIG. 2A shows a top plan view of a second embodiment of the angle measurement tool with alignment edges and the elongate members set at an angle of 90 degrees relative to each other.
Figure 2B:
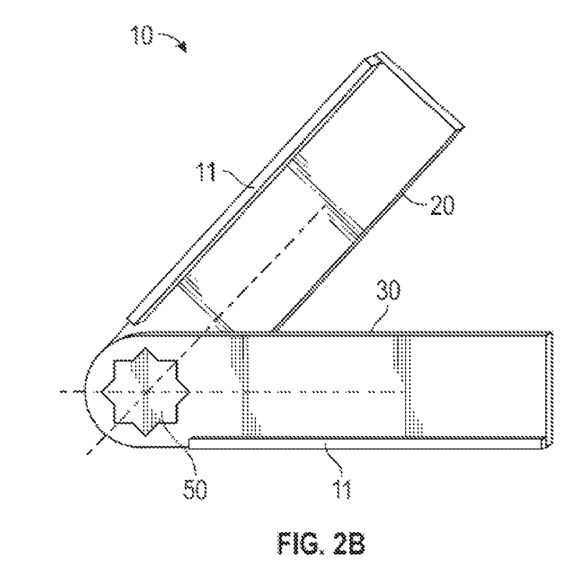
FIG. 2B shows the embodiment of the angle measurement tool of FIG. 2A with the elongate members set at an angle of 45 degrees relative to each other.

The elongate members can be detached and reattached to each other by insertion of the fixing member 50 in the aperture 40 at increments of 45 degrees or multiples of 45 degrees relative to each other as illustrated in FIG. 2A-B. FIG. 2A shows the elongate members 20, 30 at an angle of 90 degrees and FIG. 2B at an angle of 45 degrees relative to each other. As shown in FIGS. 2A-B the elongate members 20, 30 can have edges 11 to facilitate alignment of the angle measurement tool 10 with an object.

In the embodiments shown in FIGS. 1 and 2, the orientation of the aperture 40 and the fixing member 50 on the first and second elongate members 20, 30 is such that opposing corners 40'/40" and 50'/50" are respectively aligned with the respective straight edges 21 or 31 of the first and second elongate members 20, 30 as indicated by the dash-dotted lines. With such an arrangement of the aperture and the fixing member, the smallest angle at which the elongate members 20, 30 can be arranged relative to each other is 0 degrees. It will be appreciated that other orientations of the aperture 40 and the fixing member 50 relative to the straight edges 40/40" and 50'/50" allows fixing the elongate member 20, 30 relative to each other.

Figure 3A:
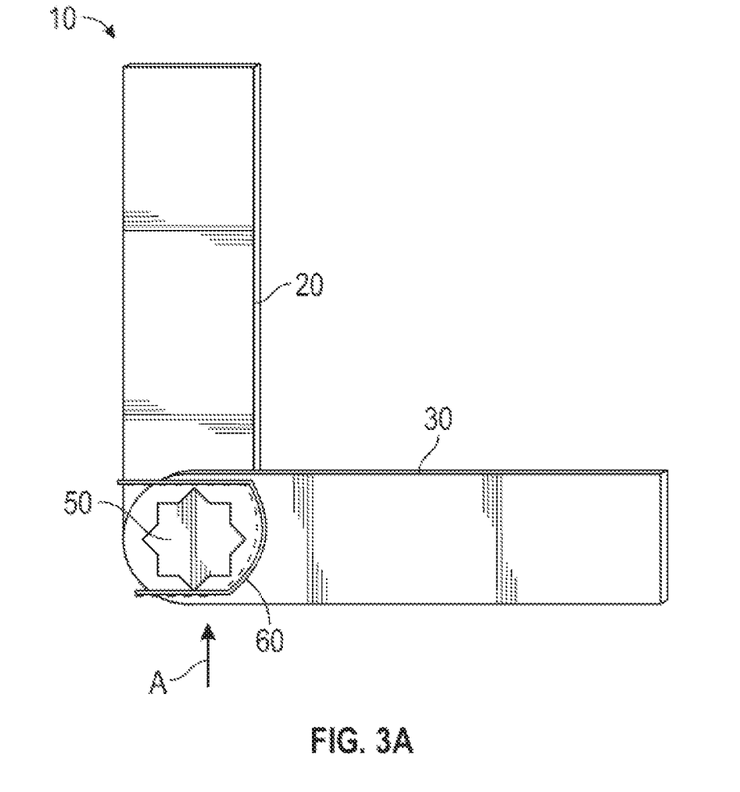
FIG. 3A shows a top view of another embodiment of the angle measurement tool including a clamp for holding the elongate members together.
Figure 3B:
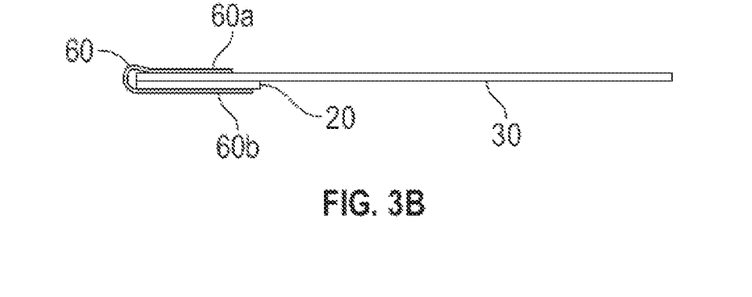
FIG. 3B shows the embodiment of the angle measurement tool of FIG. 3B in a side view taken along the direction of the arrow A.

The elongate members can be held together in different ways. FIGS. 3A-B show an embodiment of the measurement tool 10 in which the elongate members 20, 30 are held together by a resilient bracket 60 which biases the elongate members toward each other in a direction transverse to their longitudinal extents. The clamp 60 may be detachable from the elongate members or fixed on one of the elongate members 20, 30. In a particular advantageous embodiment, the elongate members 20, 30 or a portion thereof is made of a magnetic material so that the elongate members are held together by a magnetic force.

Figure 4A:
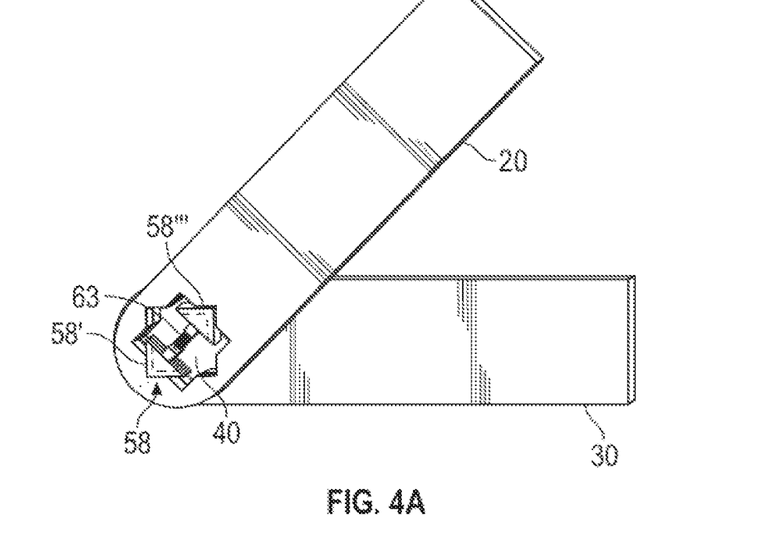
FIG. 4A shows a top view of another embodiment of the angle measurement tool with both elongate members provided with an aperture and held together with a fastener.
Figure 4B:
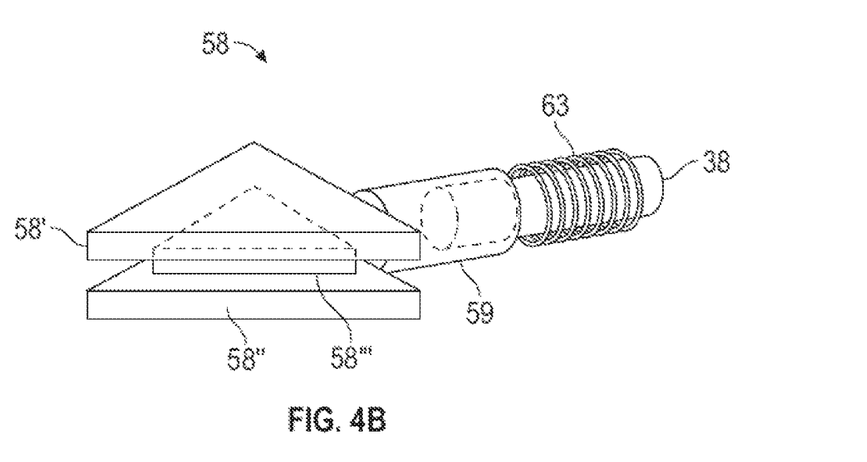
FIG. 4B shows a top side perspective view of the fastener of FIG. 4A.

FIGS. 4A-B show another embodiment of the measurement tool in which both elongate members 20, 30 are provided with the aperture 40. In this embodiment, the fixing member 58 is configured to engage in both apertures 40 of the first and second elongate members and at the same time hold the elongate members 20, 30 together. The fixing member 58 has two opposing triangular heads, each having a sleeve 59 for receiving rod 38. A spring 63 is provided between the sleeves 59 which biases the heads in opposite directions towards opposing corners of the apertures 40. Each triangular head includes top and bottom triangular plates 58', 58" and center triangular plate 58''' arranged between the top and bottom triangular plates 58', 58". The top and bottom triangular plates 58', 58" are spaced apart at a width that accommodates the width of both elongate members 20, 30. In FIG. 4B the second triangular head is not shown for reasons of simplicity.

In order to fix the elongate members 20, 30 at a desired angle relative to each other, the elongate members 20, 30 are placed against each other so that their apertures 40 are aligned. The heads of the fixing member 58 are then pushed toward each other against the spring force of spring 63 and the fixing member 58 is inserted into the apertures 40. The heads of the fixing member 58 are then released so that the center triangular plates 58''' of each head engage in opposing corners of the apertures 40 as shown in FIG. 4A. At the same time the borders of the apertures of both elongate members 20, 30 become sandwiched between the top and bottom triangular plates thereby holding the elongate members 20, 30 together.

Figure 5:
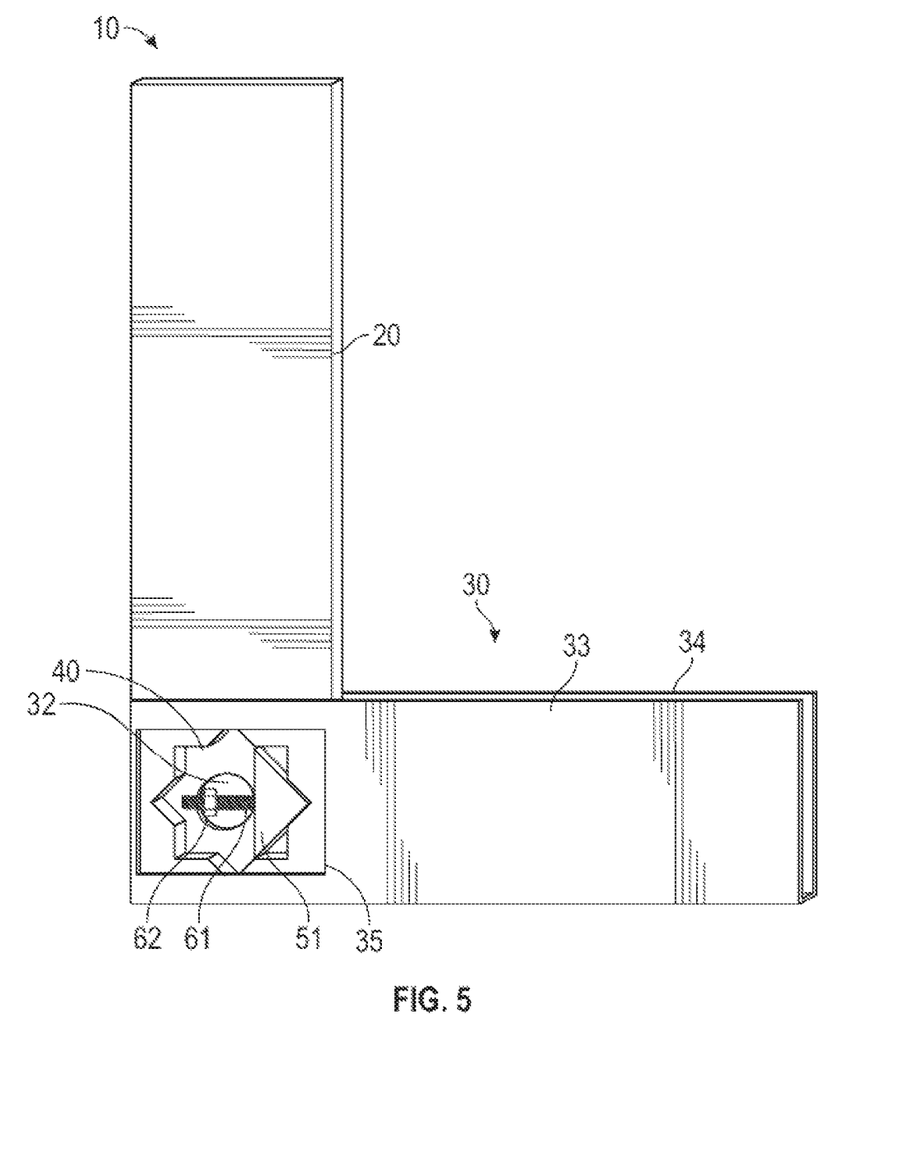
FIG. 5 shows a top perspective view of another embodiment of the measurement tool with a first variant of the fixing member.

FIG. 5 shows another embodiment of the measurement tool 10 according to the present invention in which one of the elongate members 30 is configured as a sheath having spaced apart front and rear sidewalls 33, 34. The other elongate member 20 is received between the front and rear sidewalls 33, 34. The elongate member 30 has a opening 35 in the front sidewall 33 through which at least a portion of the aperture 40 of the elongate member 20 is visible. In the embodiment shown in FIG. 5, the fixing member 51 is shaped as a triangle attached to the inside of the rear sidewall 34 and protrudes with its thickness into the space between the front and rear sidewalls 33, 34. A threaded rod 61 extends from the base of the triangular fixing member 51 toward an opposite corner of the aperture 40. The nut 62 received on the threaded bolt 61 can be turned to move toward the aperture in toward which the free end of the threaded bolt 61 faces, thereby urging the pointed side of the triangular fixing member into the opposing corner of the aperture and fixing the elongate members 20 30 relative to each other at a predetermined angle.

Figure 6:
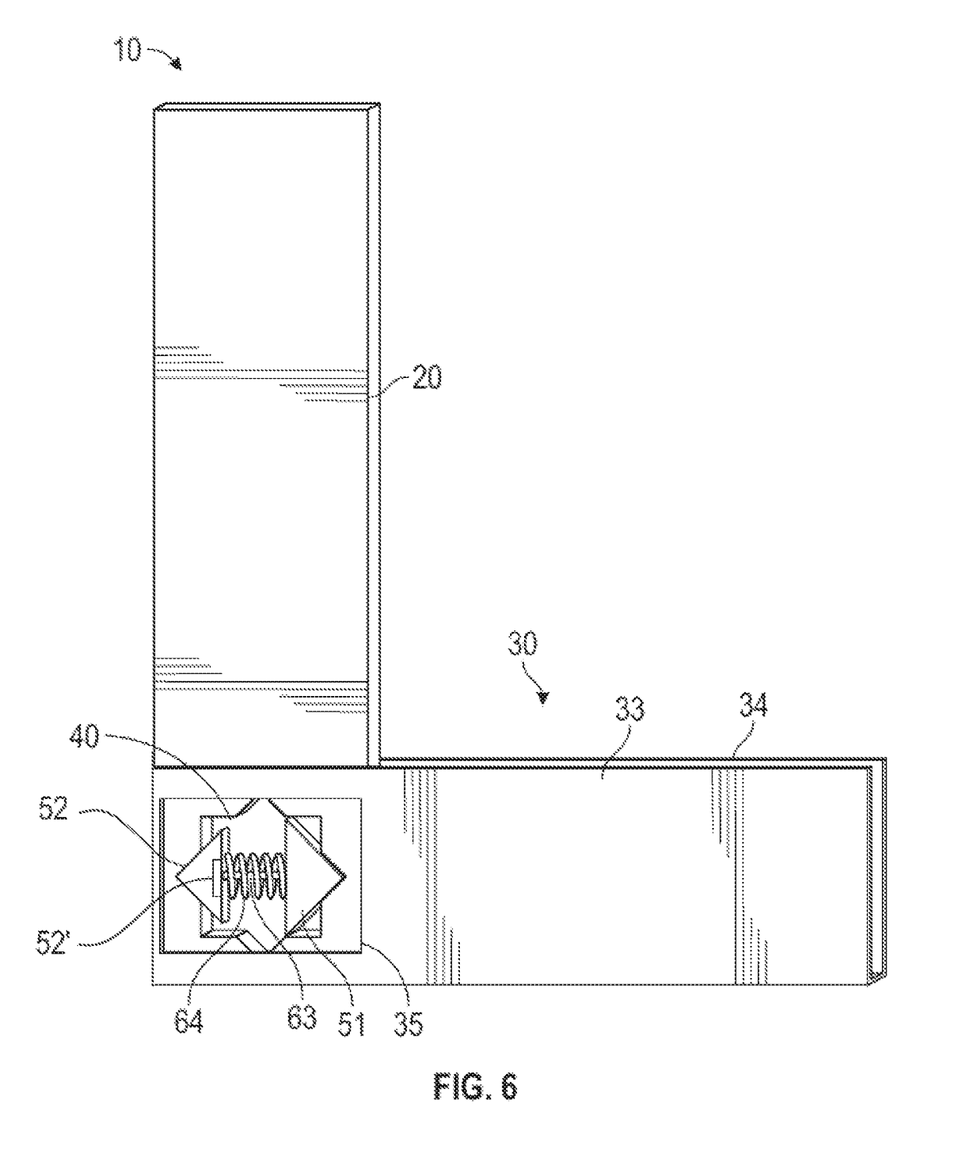
FIG. 6 shows the measurement tool of FIG. 5 with a second variant of the fixing member.

FIG. 6 shows a further embodiment of the angle measurement tool similar to the one shown in FIG. 5. Instead of a threaded bolt, a pin 64 extends from the base of the triangular fixing member 51. A second triangular member 52 is slidably received on the pin 64 and has grip 52' for moving the second triangular member on the pin in longitudinal direction of the elongate member 30. A spring 63 is received on the pin 64 and biases the second triangular member 52 into the corner of the aperture 40. As a result, the triangular members 51, 52 are urged into the opposing corners of the aperture 40, thereby fixing the elongate members 20 30 relative to each other at a predetermined angle. To enable rotation of the elongate members 20, 30 relative to each other and selection of a different angle, the triangular member 52 is moved against the bias of the spring 52 toward to the triangular member 51.

Figure 7:
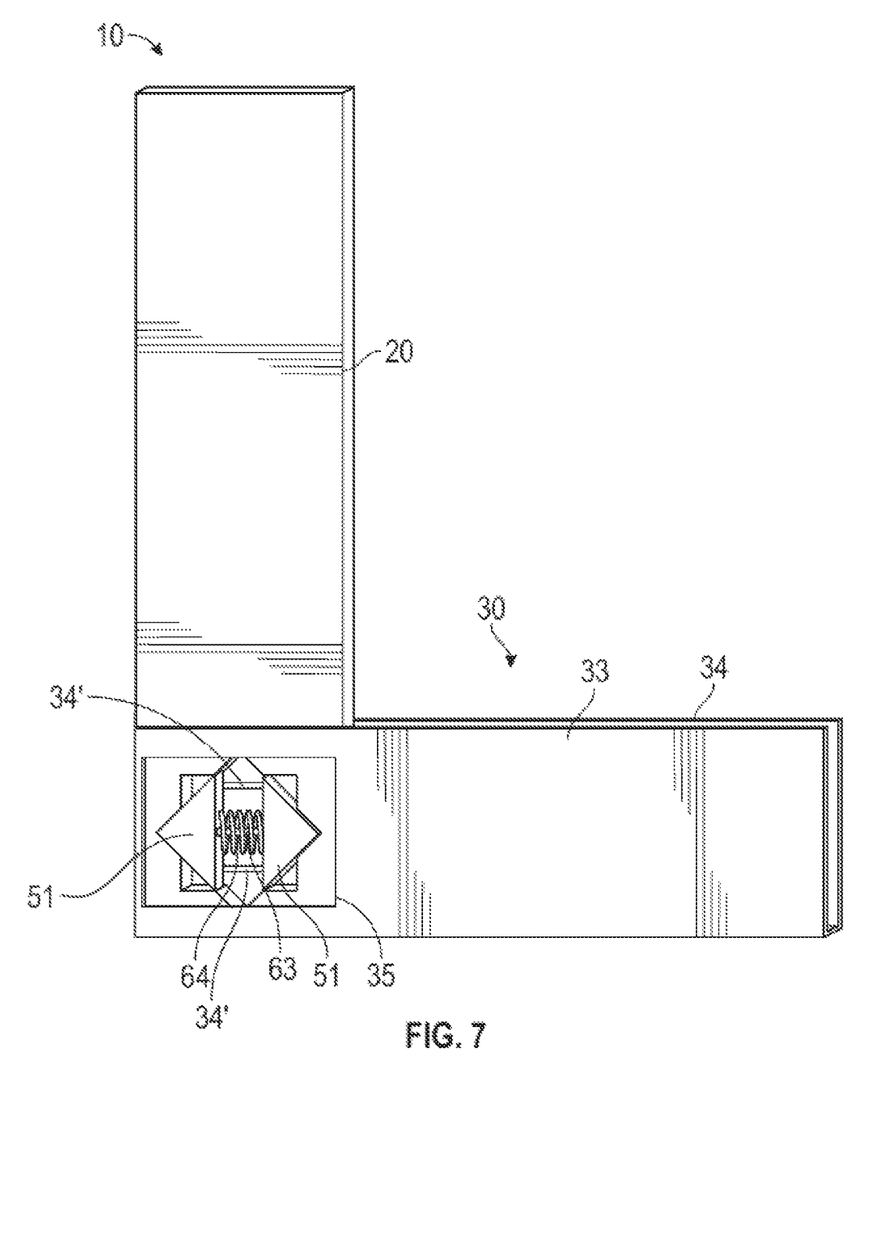
FIG. 7 shows the measurement tool of FIG. 5 with a third variant of the fixing member.

FIG. 7 shows another embodiment of the angle measurement tool 10 similar to the one shown in FIG. 6 but with the second triangular member 51 being slidably supported via pins in slots 34' in the rear sidewall 34. The pins protrude on the outer face of the rear sidewall 34 and are connected to a grip for moving the triangular member 51 in the direction of the longitudinal extent of the elongate member 30 against the bias of spring 64.

Figure 8A:
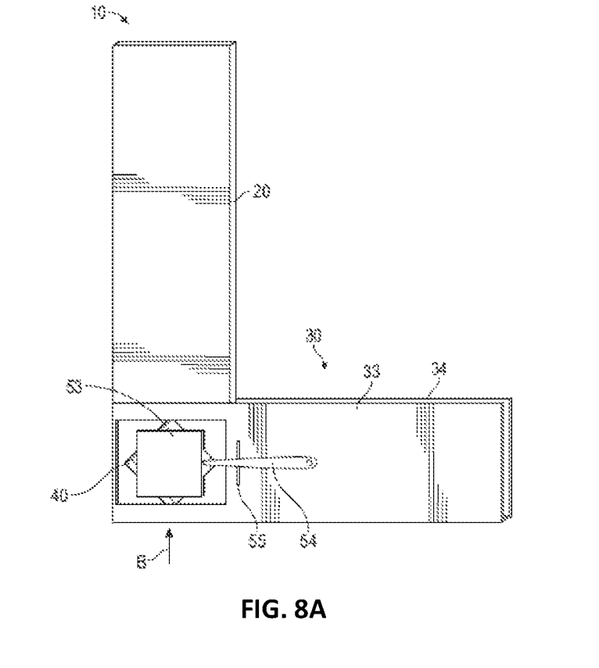
FIG. 8A shows the measurement tool of FIG. 5 with a fourth variant of the fixing member.
Figure 8B:
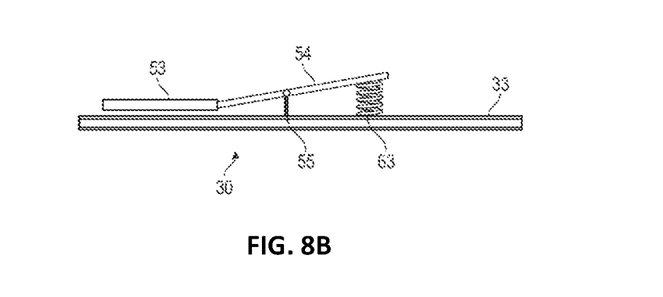
FIG. 8B shows the measurement tool of FIG. 8A in a view taken along the direction of arrow 5.
Figure 8C:
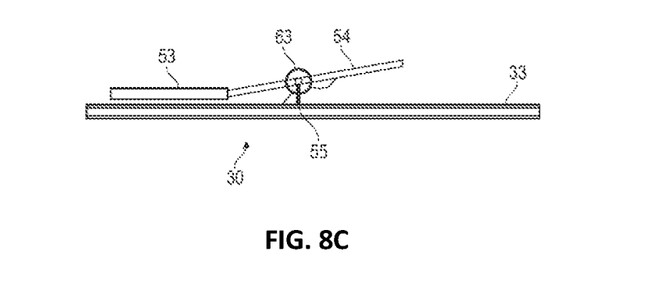
FIG. 8C shows the measurement tool of FIG. 8B with a torsion spring instead of a compression spring.

FIGS. 8A-C show a further embodiment of the measurement tool according to the present invention in which the fixing member 51 is configured as a square plate that engages in four corners of the aperture 40. The square member 53 is connected to lever 54 which is pivotably supported on mount 55. By pivoting lever 54 about mount 55, the square member 53 can be pivoted between a lower position in which it engages in the aperture 40 and an upper position in which it is disengaged from the aperture 40. As shown in FIG. 8B, a compression spring 63 is provided between the surface of the front sidewall 33 and the free end of the lever 54, which biases the square member 53 toward the lower position. FIG. 8C shows a variant of the embodiment shown in FIG. 8B but with a torsion spring 63 instead of the compression spring for biasing the lever 54 toward the lower position.

Figure 9A:
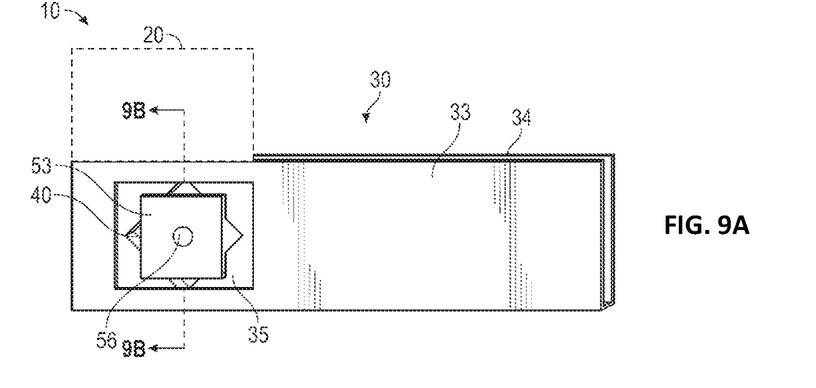
FIG. 9A shows the measurement tool of FIG. 5 with a sixth variant of the fixing member.
Figure 9B:
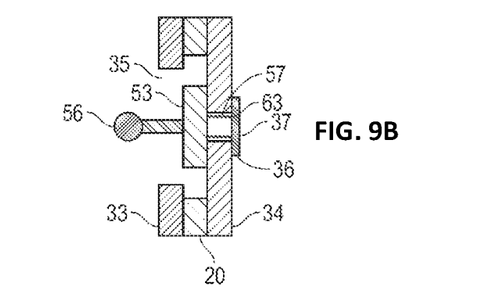
FIG. 9B shows the measurement tool of FIG. 9A in a cross section along line C-C.

FIGS. 9A-B show a further embodiment of the angle measurement tool 10 with elongate member 20 shown in phantom in FIG. 9A. In this embodiment, the fixing member is configured as a square plate 53 that can be engaged with and disengaged from the aperture 40 by movement in a direction transverse to the longitudinal extents of the elongate members 20, 30. As shown in FIG. 9B, the square plate 53 has a pull handle 56 and a hollow section 57 with which it is slidably supported in an opening 36 in the rear sidewall 34. The hollow section 56 and the opening 36 have respective cross sections so that engagement of the hollow section 56 in the opening 36 prevents rotation of the square plate 53 relative to the elongate member 30. For example, the opening 37 and the hollow section 57 can both have square cross sections dimensioned so that the outer walls of the hollow section 57 engage the inner walls of the opening 37 when the hollow section 57 is received in the opening 37. Spring 63 is received in the hollow section and is connected with one end to cover plate 37.

Figure 10A:
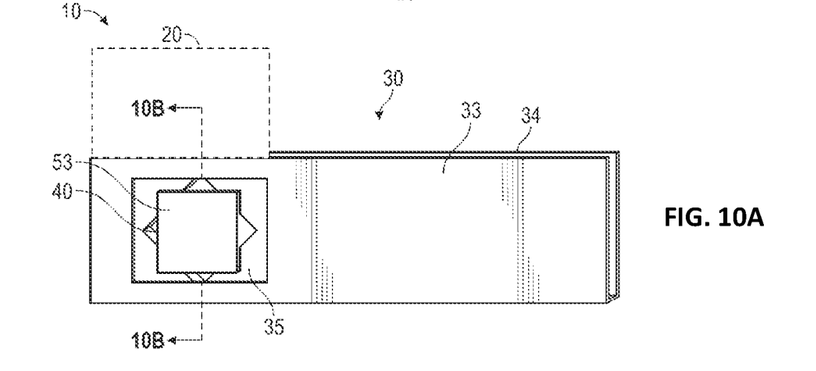
FIG. 10A shows the measurement tool of FIG. 5 with a seventh variant of the fixing member.
Figure 10B:
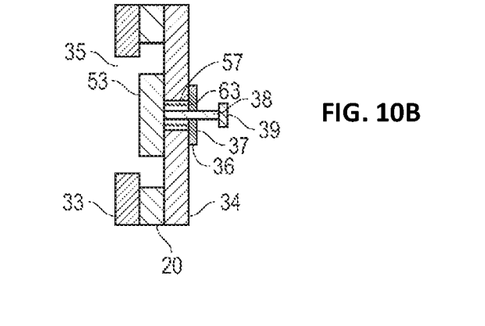
FIG. 10B shows the measurement tool of FIG. 10A in a cross section along line D-D.

FIGS. 10A-B show another variant of the embodiment of FIGS. 9A-B with elongate member 20 shown in phantom in FIG. 10A. In this variant, a pushrod 38 is connected to the side of the square plate 53 facing the rear sidewall 34 and extends through the hollow section 57 and cover plate 37. A spring 57 is connected with one of its ends to the square plate 53 and with its other end to the face of cover plate 37 which faces toward the front sidewall 33. By pushing the pushrod 38 toward the front sidewall 33 the square plate 53 is moved out of engagement with the aperture 40 against the spring bias of spring 63. When the pushrod 38 is released the square plate 53 is pulled back into engagement with the aperture 40 by the spring 63.

Figure 11:
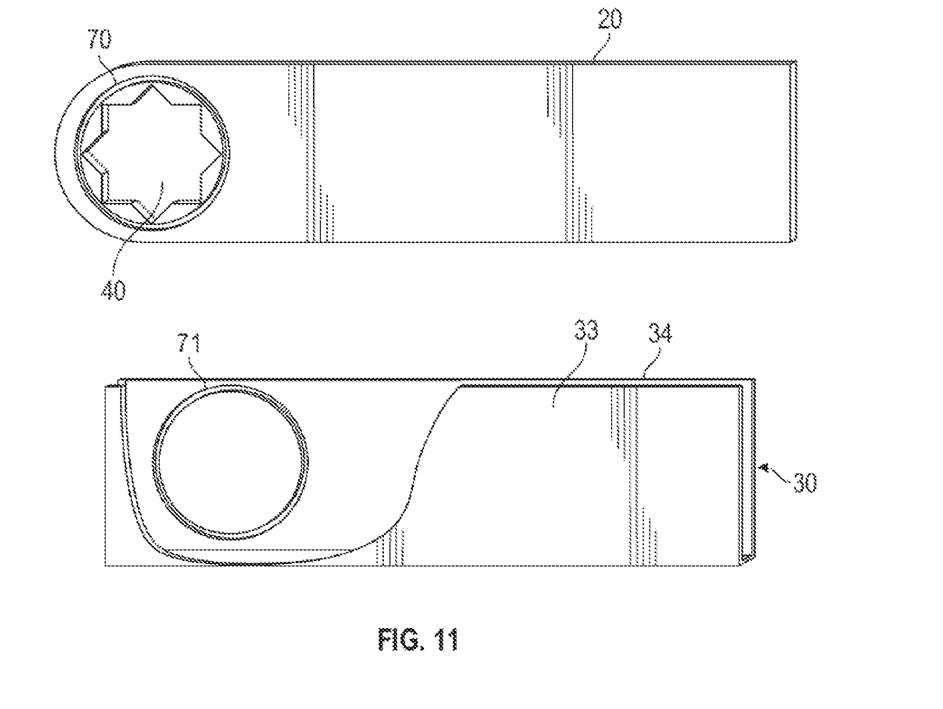
FIG. 11 shows a top view of another embodiment of the measurement tool with groove and ring as bearing with the elongate members detached.

FIG. 11 shows another embodiment of the adjustable angle measurement tool according to the present invention which further includes a bearing by which the elongate members are coupled to each other for rotation relative to each other about a pivot axis extending transverse to the longitudinal extent of the elongate members 20, 30 through the center of the ring and the geographical center of the aperture 40. In the embodiment shown in FIG. 11 the bearing includes a groove 70 formed on the elongate member 20 about the aperture 40 and a ring 71 extending from the inside face of the rear sidewall 34 of the elongate member 30. In FIG. 11 the front sidewall 33 has been partially removed for better visibility of the ring 71. In the assembled state, the ring 71 slidably engages in the groove 70.

Figure 12A:
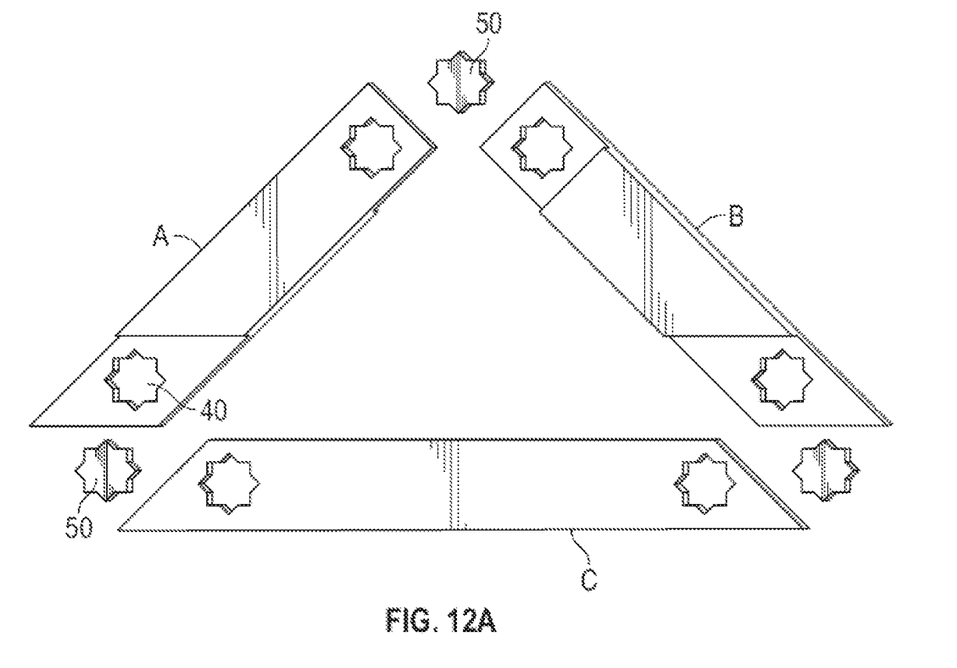
FIG. 12A shows a top view of another embodiment of the measurement tool including three elongate members in the unassembled state.
Figure 12B:
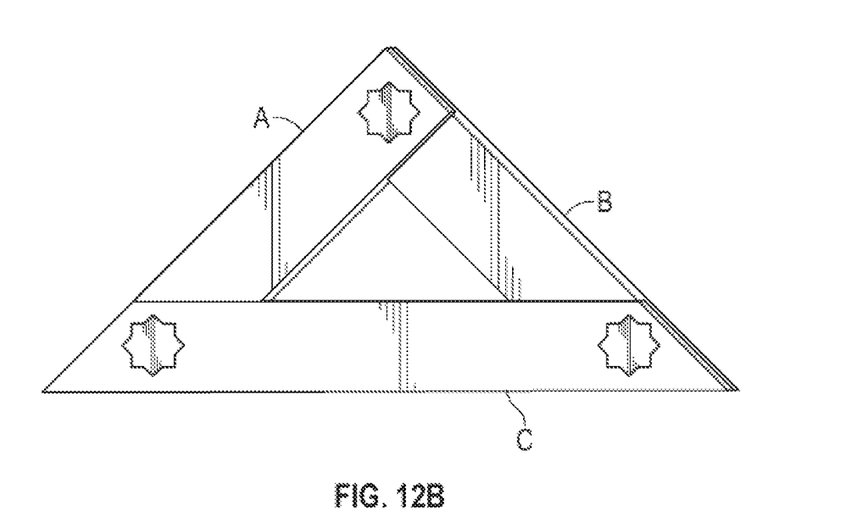
FIG. 12B shows the measurement tool of FIG. 12A in the assembled state.

FIGS. 12A-D show another embodiment of the angle measurement tool including three elongate members A, B and C. The elongate members A, B and C can be assembled into triangles whose outer edges define different angles. FIG. 12 shows a variant of the embodiment with the elongate members A, B, C in the disassembled state. The elongate members in this variant have apertures 40 at their ends. The apertures 40 are shaped as the aperture 40 of the embodiments described above. The elongate members A, B, C have reduced thicknesses at their mating ends so that all flat sides of the triangle resulting after assembly of the elongate members are flush as shown in FIG. 12B.

The elongate members A, B, C are assembled by aligning the apertures 40 of two respective elongate members and inserting fixing member 50 in the respective aligned apertures. Fixing member 50 has a thickness sufficient to engage in the aligned apertures of two respective elongate members so as to fix the two respective elongate with each other at a predetermined angle.

Figure 12C:
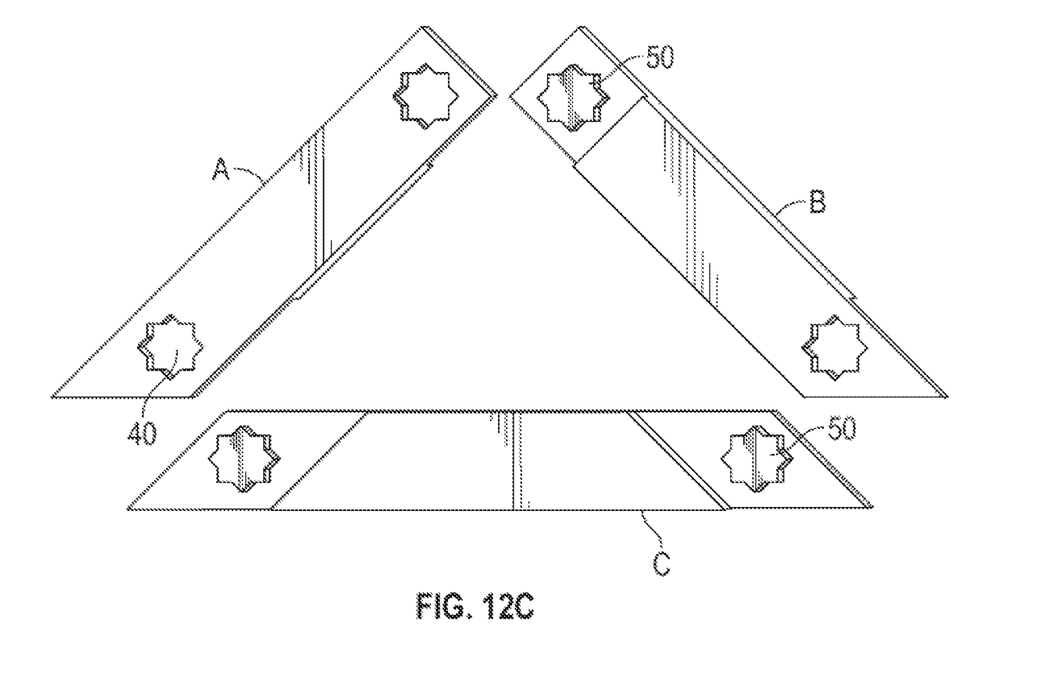
FIG. 12C shows a top view of another embodiment of the measurement tool including three elongate members in the unassembled state.
Figure 12D:
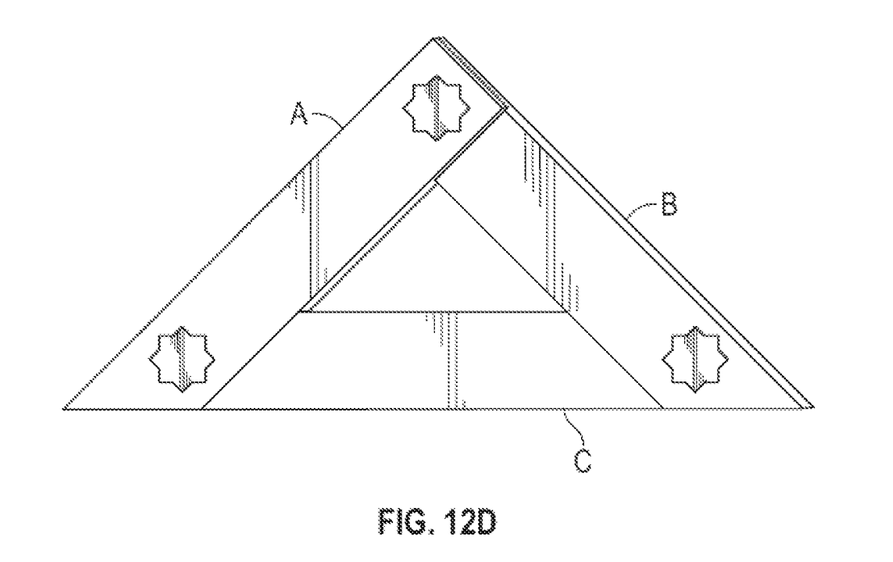
FIG. 12D shows the measurement tool of FIG. 12C in the assembled state.

In another variant shown in FIG. 12C, a fixing member 50 can be permanently attached to an end or end(s) of the elongate members. In this variant, the respective ends of the elongate members with the fixing member 50 are aligned with the respective ends of the elongate members with the aperture 40 and the ends are pushed together so that the fixing members 50 engage in the apertures 40 as shown in FIG. 12D.

In the embodiments shown in FIGS. 12A-D, the elongate members A, B are fixed at an angle of 90 degrees relative to each other. However, the elongate members A, B can also be fixed relative to each other at angles different from 90 degrees, for example 45 degrees or 135 degrees. In these cases, an elongate member C with an appropriate length is selected to connect the free ends of the elongate members A, B.

What is claimed as new and desired to be protected is set forth in the appended claims and includes equivalents of the elements recited therein:

1. An angle measurement tool, comprising:
   first and second elongate members, one of the first and second longitudinal members having an aperture defined by an inner circumference shaped as an outer circumference of a regular eight-pointed star polygon; and
   the other one to the first and second elongate members having a fixing means adapted for engagement in the aperture of the first elongate member so as to fix the first and second elongate members at plural angles relative to each other in increments of 45 degrees.

2. The angle measurement tool of claim 1, wherein the second member comprises spaced apart first and second sidewalls, with the first elongate member received between the first and second sidewalls.

3. The angle measurement tool of claim 1, wherein one of the first and second sidewalls has an opening through which at least a portion of the aperture of the first elongate member is visible.

4. The angle measurement tool of claim 1, wherein the fixing means is supported on the second elongate member for movement between an engaged position in which the fixing means engages in the aperture and a disengaged position in which the fixing means is disengaged from the aperture.

5. The angle measurement tool of claim 4, further comprising a spring biasing the fixing means toward the engaged position.

6. The angle measurement tool of claim 1, further comprising a bearing, said bearing coupling the first and second elongate members for rotation relative to each other about a rotation axis defined by a geographical center of the aperture.

7. An angle measurement tool, comprising:
   a first elongate member and a second elongate member, each of said first and second elongate members provided with a respective aperture defined by an inner circumference shaped as an outer circumference of a regular eight-pointed star polygon; and
   fixing means adapted for engagement in the aperture of the first and second elongate member so as to fix the first and second elongate members at plural angles relative to each other in increments of 45 degrees.

8. An angle measurement tool, comprising:
   first, second and third elongate members detachably attachable to each other so as to form a triangle, said-first, second and third elongate members fixable at plural angles relative to each other in increments of 45 degrees via engagement of fixing means in apertures provided in at least two of the first, second and third elongate members, the apertures being respectively defined by an inner circumference shaped as an outer circumference of a regular eight-pointed star polygon.

* * * * *